(12) United States Patent
Campbell et al.

(10) Patent No.: US 8,370,457 B2
(45) Date of Patent: *Feb. 5, 2013

(54) NETWORK COMMUNICATION THROUGH A VIRTUAL DOMAIN

(75) Inventors: Douglas A. Campbell, Henderson, NV (US); Alan B. Hamor, Pennington, NJ (US); Mike D. Helton, Las Vegas, NV (US)

(73) Assignee: Darmate Glassworks LLC, Las Vegas, NV (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/717,911

(22) Filed: Mar. 13, 2007

(65) Prior Publication Data

US 2007/0162590 A1    Jul. 12, 2007

Related U.S. Application Data

(62) Division of application No. 09/542,858, filed on Apr. 4, 2000, now Pat. No. 7,209,959.

(51) Int. Cl.
G06F 15/16    (2006.01)

(52) U.S. Cl. .................. 709/219; 709/203; 709/223

(58) Field of Classification Search .................. 709/201, 709/203, 204, 207, 219, 225, 245, 223, 227
See application file for complete search history.

(56) References Cited

U.S. PATENT DOCUMENTS

| | | | | |
|---|---|---|---|---|
| 5,636,371 A | * | 6/1997 | Yu | 703/26 |
| 5,708,654 A | * | 1/1998 | Arndt et al. | 370/242 |
| 5,805,820 A | * | 9/1998 | Bellovin et al. | 709/225 |
| 5,926,549 A | | 7/1999 | Pinkas | |
| 5,931,912 A | | 8/1999 | Wu et al. | |
| 5,961,593 A | | 10/1999 | Gabber et al. | |
| 6,003,083 A | * | 12/1999 | Davies et al. | 709/226 |
| 6,014,660 A | | 1/2000 | Lim et al. | |
| 6,014,698 A | | 1/2000 | Griffiths | |
| 6,026,445 A | | 2/2000 | Kephart et al. | |
| 6,052,736 A | * | 4/2000 | Ogle et al. | 709/244 |
| 6,091,951 A | * | 7/2000 | Sturniolo et al. | 455/432.2 |
| 6,092,100 A | * | 7/2000 | Berstis et al. | 709/203 |
| 6,098,111 A | | 8/2000 | Maegawa et al. | |
| 6,119,171 A | | 9/2000 | Alkhatib | |
| 6,182,148 B1 | | 1/2001 | Tout | |
| 6,185,626 B1 | | 2/2001 | Chivi et al. | |
| 6,189,030 B1 | | 2/2001 | Kirsch et al. | |
| 6,195,691 B1 | * | 2/2001 | Brown | 709/219 |
| 6,201,962 B1 | * | 3/2001 | Sturniolo et al. | 455/432.2 |
| 6,205,489 B1 | | 3/2001 | Kapoor | |
| 6,249,801 B1 | * | 6/2001 | Zisapel et al. | 718/105 |
| 6,256,664 B1 | * | 7/2001 | Donoho et al. | 709/204 |
| 6,256,739 B1 | | 7/2001 | Skopp et al. | |
| 6,262,976 B1 | | 7/2001 | McNamara | |
| 6,272,540 B1 | * | 8/2001 | Yadav et al. | 709/223 |

(Continued)

OTHER PUBLICATIONS

International Search Report Dated Aug. 28, 2001, for International Application No. PCT/US01/08637, 7 pages.

(Continued)

*Primary Examiner* — Van Nguyen
(74) *Attorney, Agent, or Firm* — Turocy & Watson, LLP (57) ABSTRACT

The present invention is an apparatus, system and method for communicating to a network through an ad hoc virtual domain. The present invention contains a deceiver, a controller, and a forwarder through which a client communicates through. The deceiver, controller, and forwarder collectively establish the domain in which the ad hoc virtual namespace will exist. This invention allows clients to interact over a network in a fashion that is anonymous and unique to the session which the client is engaging in.

24 Claims, 4 Drawing Sheets

U.S. PATENT DOCUMENTS

| | | | |
|---|---|---|---|
| 6,317,775 B1 * | 11/2001 | Coile et al. | 709/201 |
| 6,338,082 B1 | 1/2002 | Schneider | |
| 6,353,850 B1 | 3/2002 | Wies et al. | |
| 6,370,584 B1 * | 4/2002 | Bestavros et al. | 709/238 |
| 6,442,687 B1 | 8/2002 | Savage | |
| 6,449,657 B2 * | 9/2002 | Stanbach et al. | 709/245 |
| 6,493,765 B1 | 12/2002 | Cunningham et al. | |
| 6,496,931 B1 | 12/2002 | Rajchel et al. | |
| 6,502,135 B1 * | 12/2002 | Munger et al. | 709/225 |
| 6,507,585 B1 * | 1/2003 | Dobson | 370/420 |
| 6,510,464 B1 | 1/2003 | Grantges et al. | |
| 6,549,516 B1 * | 4/2003 | Albert et al. | 370/236 |
| 6,594,254 B1 * | 7/2003 | Kelly | 370/352 |
| 6,606,315 B1 * | 8/2003 | Albert et al. | 370/352 |
| 6,628,654 B1 * | 9/2003 | Albert et al. | 370/389 |
| 6,629,149 B1 * | 9/2003 | Fraser et al. | 709/245 |
| 6,633,560 B1 * | 10/2003 | Albert et al. | 370/351 |
| 6,674,743 B1 * | 1/2004 | Amara et al. | 370/351 |
| 6,704,317 B1 * | 3/2004 | Dobson | 370/401 |
| 6,718,359 B2 * | 4/2004 | Zisapel et al. | 718/105 |
| 6,751,677 B1 | 6/2004 | Ilnicki et al. | |
| 6,779,039 B1 * | 8/2004 | Bommareddy et al. | 709/238 |
| 6,785,705 B1 | 8/2004 | Kocherlakota | |
| 6,823,454 B1 * | 11/2004 | Hind et al. | 713/168 |
| 6,880,089 B1 * | 4/2005 | Bommareddy et al. | 726/11 |
| 6,891,887 B1 * | 5/2005 | Dobson | 375/220 |
| 6,910,180 B1 | 6/2005 | Cui et al. | |
| 6,931,434 B1 * | 8/2005 | Donoho et al. | 709/207 |
| 7,472,200 B1 * | 12/2008 | Taylor et al. | 709/238 |
| 7,801,080 B2 * | 9/2010 | Kim et al. | 370/331 |

OTHER PUBLICATIONS

RFC 1034, "Domain Names—Concepts and Facilities," Network Working Group, P. Mockapetris, ISI, Nov. 1987; pp. 1-37.

RFC 1035, "Domain Names—Implementation and Specification," Network Working Group, P. Mockapetris, ISI, Nov. 1987; pp. 1-38.

* cited by examiner

| # | Source Address | Destination Address | Data Field |
|---|---|---|---|
| 1 | 192.168.1.101 Port: 1234 | 192.168.1.104 Port: 0053 | www.edrtech.com |
| 2 | 192.168.1.104 Port: 0053 | 192.168.1.105 Port: 1234 | www.edrtech.com |
| 3 | 192.168.1.105 Port: 1234 | 192.168.1.102 Port: 1234 | www.edrtech.com |
| 4 | 192.168.1.102 Port: 1234 | 192.168.1.105 Port: 1234 | 192.168.1.106 |
| 5 | 192.168.1.105 Port: 1234 | 192.168.1.104 Port: 0053 | 192.168.1.106 |
| 6 | 192.168.1.104 Port: 0053 | 192.168.1.101 Port: 1234 | 192.168.1.106 |
| 7 | 192.168.1.101 Port: 1234 | 192.168.1.106 Port: 0060 | Data (00101101) |
| 8 | | | Forwarder query for valid user / website destination |
| 9 | | | Controller response to Forwarder query |
| 10 | 192.168.1.106 Port: 0060 | 192.168.1.103 Port: 0080 | Data (00101101) |
| 11 | 192.168.1.103 Port: 0080 | 192.168.1.106 Port: 0060 | Data (00101101) |
| 12 | 192.168.1.106 Port: 0060 | 192.168.1.101 Port: 1234 | Data (00101101) |

NETWORK COMMUNICATION THROUGH A VIRTUAL DOMAIN

CROSS REFERENCE TO RELATED APPLICATION

The present application is a divisional of U.S. patent application Ser. No. 09/542,858, filed Apr. 4, 2000, now U.S. Pat. No. 7,209,959, which is incorporated herein by reference in its entirety.

SCOPE OF THE INVENTION

This invention relates generally to networks and network systems, and more specifically to a system and method for enabling anonymous network activity, while establishing virtual namespaces for clients.

BACKGROUND

The proliferation and expansion of computer systems, networks, databases, the Internet, and particularly the World Wide Web (WWW), has resulted in a vast and diverse collection of information and means of communication. The current Internet infrastructure involves millions of computers linked together on a computer network. This network allows all of the computers to communicate with one another. Clients are typically linked to the Internet via Internet Service Providers (ISP's), which in turn connect to larger ISP's. This allows numerous clients to communicate to each other through their various connections.

In general, all the machines on the Internet can be categorized into two types: servers and clients. Typically, machines that provide services (like Web servers, FTP servers, Email servers, etc.) are servers. Servers are loaded with the appropriate software in order to allow them to perform their intended services. Machines that request information from servers are typically called clients. In order to differentiate between machines on the network, each machine is given a unique address called an IP address.

The IP address is a thirty-two bit number that is normally expressed as 4 octets in a dotted decimal number (e.g., 192.168.1.101). Each of the octets can have values between 0 and 255 ($2^8$ possibilities per octet). When a client connects to the Internet, the client is assigned an IP address through their Internet Service Provider (ISP) for the duration of the connection. Conversely, the IP addresses of servers are relatively static, and do not change very often.

Because it is difficult for clients to remember IP addresses, and because IP addresses need to change, most servers on the Internet possess domain names (e.g., "www.whoknowz.com") to help users reach their intended servers without remembering strings of numbers. Name servers, used in the domain name system (DNS), map the human-readable names into IP addresses to help clients reach their destinations. When a client enters a domain name, the browser (via a resolver) extracts the domain name and passes it to a name server, which will return the correct IP address to the associated site. The Domain Name System is comprised of a distributed database and name servers that access that database.

One of the main problems with the current utilization of IP addresses and domain names on the World Wide Web (WWW) is that the WWW is based largely on the hypertext transport protocol ("HTTP-protocol"). The nature of HTTP-protocol allows information, such as a client's e-mail address, web sites that were visited, and information on the client's software and host computer, to be recorded and traced by the server. This opens up the user to a range of privacy threats including unwanted e-mails, solicitations, and "cookies" (data that is stored on the client's machine by a server and subsequently used for identification). Furthermore, clients that wish to cloak themselves from such intrusions are forced into systems that simply provide alternate account identities for the client; while the client is protected, the alternate account identity becomes the object of the unwanted e-mails, "cookies", etc. instead. The effect of this is similar to the client manually creating a new user account in which to browse the WWW.

One of the solutions available is to route the client through a proxy server in order to substitute IP information being sent by the client. When a client desires to visit a web server, the packets sent from client's computer are routed through a proxy server. At the proxy server, the server executes algorithms to extract information that would identify the client, and replaces the information with predetermined substitutes. Afterwards, the proxy server routes the packet out to the web server. Once the web server receives the packet, all of the information points back to the proxy server, and not to the client. This in effect "hides" the client from the web server.

However, a drawback to such systems is that, as mentioned before, the client is obtaining protection merely through the use of an alternate identity that is ultimately assigned back to the same client. Furthermore, current systems do not have any added flexibility designed in the system to take advantage of anonymous client group browsing or multiple group association. In order to fully take advantage of ad hoc identity browsing, additional features need to be added in order to create a "community-like" environment among numerous anonymous clients.

SUMMARY OF THE INVENTION

To address the above-discussed deficiencies in existing systems, the present invention involves the use of three algorithms, known collectively as DNS Misdirection and individually as the deceiver, the controller, and the forwarder. The deceiver communicates with clients and with the controller. The deceiver provides name resolution for clients. The routine works the same as a standard name server, except when a query is received from a client, the deceiver allows the controller to supply the information. The controller communicates with the deceiver and the forwarder. The controller determines the address, "time to live" (TTL), and other DNS result fields and returns them to the deceiver. The controller is queried by the forwarder for the site address that the client intended to reach.

One advantage of the invention deals with isolating client activity on the Internet. Another important feature of the invention is that the DNS Misdirection system allows for the creation of virtual namespaces. Through these namespaces, the isolated clients can anonymously browse the Internet while being part of a virtual community. By utilizing virtual namespaces and generated root domain names (e.g., "carlover", "winetaster", "stockpicker"), the community activities would be inaccessible to all but intended clients. Furthermore, since virtual namespaces would create a domain through which clients could identify themselves and communicate through, network administrators could establish ad hoc software applications as well as domain-specific identifiers that could be assigned to a user or groups of users.

BRIEF DESCRIPTION OF THE DRAWINGS

The following drawings illustrate certain embodiments of the present invention.

DETAILED DESCRIPTION

Figure 1:
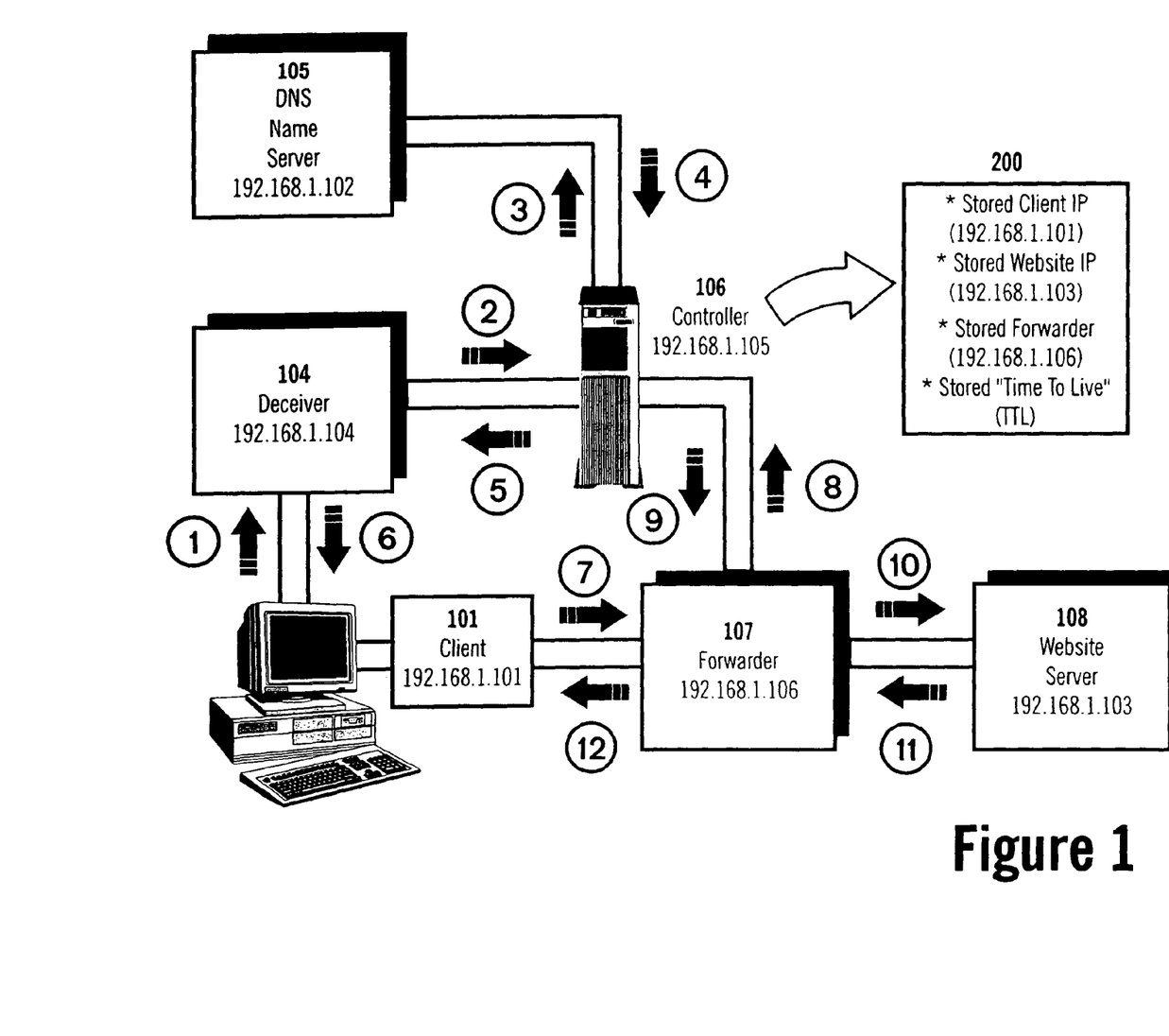
FIG. 1 schematically shows the system architecture of an exemplary network on which one embodiment of the invention may be implemented.

FIG. 1 illustrates an embodiment of the system architecture that contains at least one client (101). This client consists of a personal computer, which contains an interface to a computer network, such as a modem, network interface card, etc. The client (101) may also be generalized as any client application. Loaded in the client computer (101) are an Internet browser and a resolver (not shown). When the client (101) wishes to connect to a site on the Internet, the client (101) will typically enter a destination site domain name into the computer's Internet browser (e.g., "www.whoknowz.com"). In FIG. 1, the destination site is a web server (108). The Internet browser will typically be connected through an ISP (not shown). The domain name can be embedded in a URL (via hyperlink), or can be explicitly entered by the client.

If the client (101) is to reach the web server (108), the client needs to obtain the web server's (108) IP address, shown in FIG. 1 (all of the hypothetically disclosed IP addresses in the invention are shown in the figure). With the architecture used in existing systems, the IP address must be resolved into a 32 bit (IPv4)/128 bit (IPv6) IP address. Normally, the ISP will furnish the clients with a DNS (105), which is accessed through the client's resolver. The resolver is typically predisposed with two IP addresses, which represent the primary and secondary name servers that may be accessed. The name of the server may be entered manually, or may be provided by using Dynamic Host Configuration Protocol (DHCP). The process of resolving domain names, and the operation of DNS servers is addressed further in detail in RFC 1034 ("Domain Names—Concepts and Facilities"—last update: Nov. 17, 1999), and RFC 1035 ("Domain Names—Implementation and Specification"—last update: Nov. 17, 1999).

Figure 2:
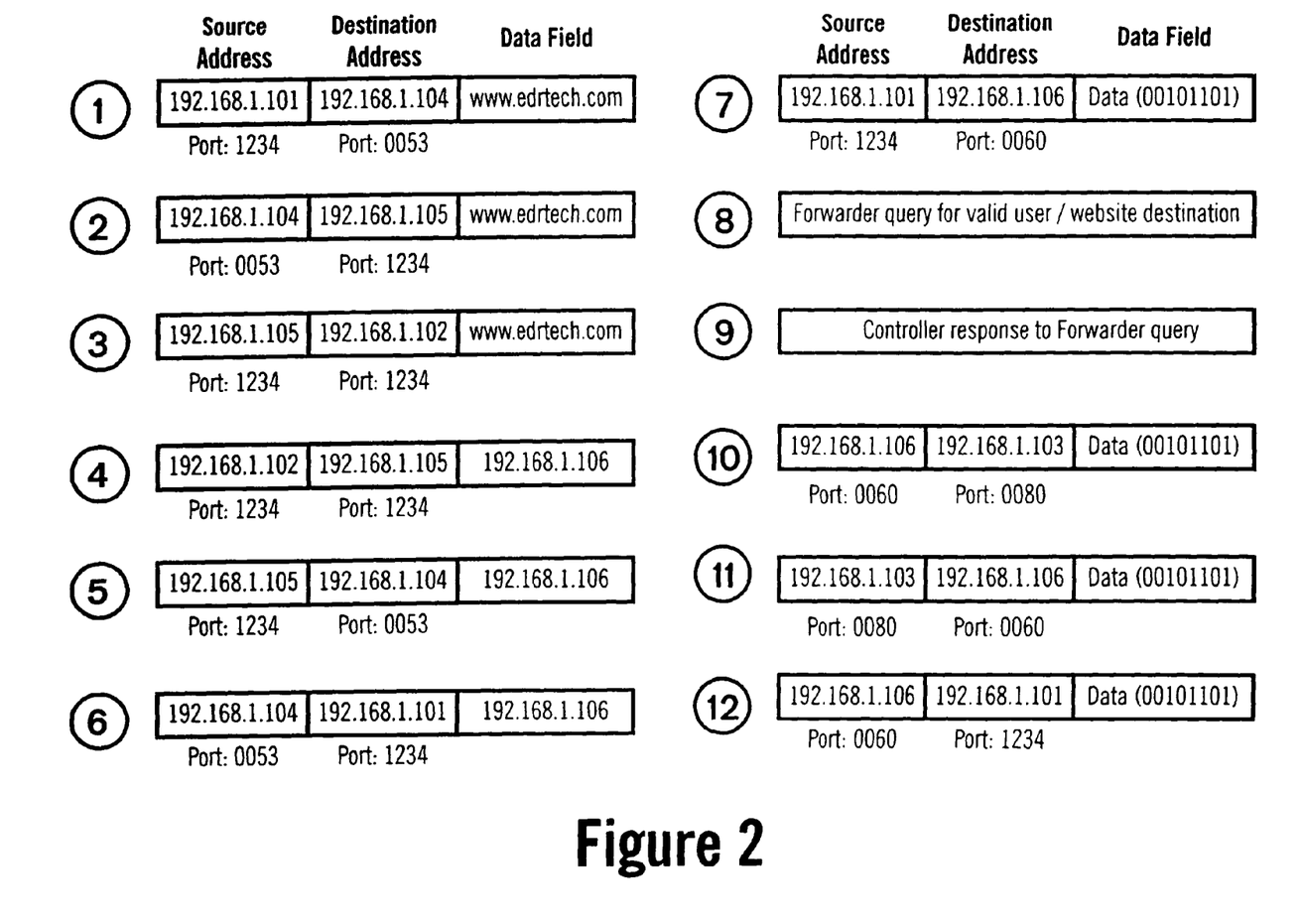
FIG. 2 illustrates the packet contents as they are routed through the network.

Under the current invention, when an unresolved packet is sent from client (101), the packet is processed through the deceiver (104). A more detailed representation of the packet, as well as exemplary port connections, is shown in FIG. 2. It should be pointed out that the term "packet" may mean an IP packet, an UDP datagram, or other transmitted data. When the packet (1) is transmitted, the packet will be transparently addressed to the deceiver (104). Upon receipt of the packet, the deceiver (104) will recognize the source of the packet (1) through the IP source address, shown in FIG. 2. The fields in which the IP source and destination addresses function are described in greater detail in RFC 791 ("DARPA Internet Program Protocol Specification"). By parsing the data field through the controller (106), the deceiver will determine the intended domain name that the client (101) wants to reach.

From this point, the deceiver (104) queries the controller (106) to initiate a name resolution. The controller (106) then sends the packet (2) where the IP destination address of the DNS (105) is now placed in the packet (2), and is transmitted onward. In the meantime, the controller (106) stores the client's (101) IP location, and determines a name-to-IP address time-to-live (TTL). The TTL is the time period in which the client (101) may assume a valid name-to-IP address. The TTL of the name-to-IP address may be established through the use of cache, or any other suitable memory available. Typically, the TTL field is a 32 bit integer that represents units of seconds, and is primarily used by resolvers when they cache network resource records. The TTL describes how long a resource record can be cached before it should be discarded. The TTL may be assigned by the administrator for the zone where the data originates. Under the present invention, once the TTL expires, the client must perform another query in order to establish a connection with an IP address.

Upon receipt of the packet (2), the controller (106) determines the source of the packet, and subsequently proceeds to process the domain name resolution request, and queries the DNS name server (105) in packet (3) to obtain the website server (108) IP address. When the destination website IP address is resolved in the DNS (105), it is transmitted back to the controller (106) in packet (4). When the controller (106) obtains the IP address of the destination website server (108), the controller (106) then proceeds to establish connection with a forwarder (107) through which to communicate through. Once connected, the controller (106) then records the IP address of the forwarder (107). The forwarder's (107) address is then used by the controller (106) to create a valid session for the client (101), by correlating the forwarder address with the TTL of the client (101) and the destination website server (108). As long as the client's name-to-IP-address has not expired (i.e., the TTL has not run out), the controller (107) will associate the established forwarder (107) with the session. After connecting with a forwarder (107), the controller (106) then proceeds to store the client (101) IP address, the destination website (108) IP address, the IP address of the forwarder (107), and the determined TTL. The stored elements (200) are disclosed in FIG. 1.

After storing the pertinent information, the controller (106) then returns the forwarder (107) IP address back to the deceiver (104) via packet (5). The contents of packet (5) are shown in FIG. 2. After the packet (5) is routed through the deceiver (104), the packet (6) is then transmitted to the client (101), along with the TTL. Upon receipt of the packet (6), the client will be "deceived" into thinking that the forwarder (107) IP address is actually the destination website server (108). At this point, any communication between the client (101) and the website server (108) will be taking place in a virtual domain, since both the client (101) and the website server (108) do not technically exist to each other—the client is isolated from the destination sites of his or her data packets, and the destination sites are isolated from the clients that are accessing the site.

One advantage of this configuration is that the virtual namespaces allow system administrators and clients to create a virtually endless string of identities for clients and their target website server(s). For example, a virtual namespace may be set up as ".bank", thus identifying a bank classification. If a client wishes to visit a server that is known to be related to banks, the client could type "wellsfargo.bank" and be routed to "wellsfargo.com" via the system described in FIG. 1. Alternately, a client could enter "*.bank" and receive an HTML page with all registered entries. Furthermore, the client could customize the identification used on the Internet (e.g., "wellsfargo.doug"). Names could be created ad hoc or could be associated with groupware (e.g., "mother.birthday.card"; "smith.family.reunion.newyork"). The variations are virtually endless.

Some of the implementations of the virtual namespaces and underlying domains include, but are not limited to:

(1) creating unique environments for marketing, branding, advertising and promotion purposes;
(2) allowing for personalized Web identities for individuals, corporations, organizations, etc.;
(3) providing anonymous browsing, searching and e-mailing;
(4) creating environments for users to establish groups for collaborative communication or application purposes;
(5) cataloguing domain names under intuitive categories or functions (e.g. "bestbuy.shop", "amazon.shop", etc.)
(6) creating a search index which allows the user(s) to locate all members of a specific category and identifying distinct products, goods, services, content, or information provided by any ember of any category and/or identification.
(7) creating directories that contain telephone, Internet, fax, wireless, page, cellular, e-mail, instant messaging and/or similar data under one or more human readable formats addressable by a communication device.

When the client makes a transmission to the website server (108), the packet (7) is now routed to the forwarder (107). The client (101) will typically connect to the forwarder (107) through a well-known port. After receiving the packet from the client (101), the forwarder (107) proceeds to query the controller (106) (shown as packet (8)) to determine: (1) whether the client (101) is valid; (2) if the TTL has not expired; and (3) if the IP address of the website server (108) that the client wishes to connect to is valid. If everything is confirmed, the controller (106) then sends back the relevant information via packet (9). The forwarder (107) then extracts the needed information including the website server (108) IP address, and forwards the packet on to it's intended destination.

It should be understood that the deceiver (104), the controller (106), and the forwarder (107) are applications. The website server (108) may be generalized as any server application. Furthermore, the deceiver (104), the controller (106), and the forwarder (107) can all be on a single computer, or separate computers. Also, the deceiver (104) and the controller (105) can be on the client's computer.

Figure 3:
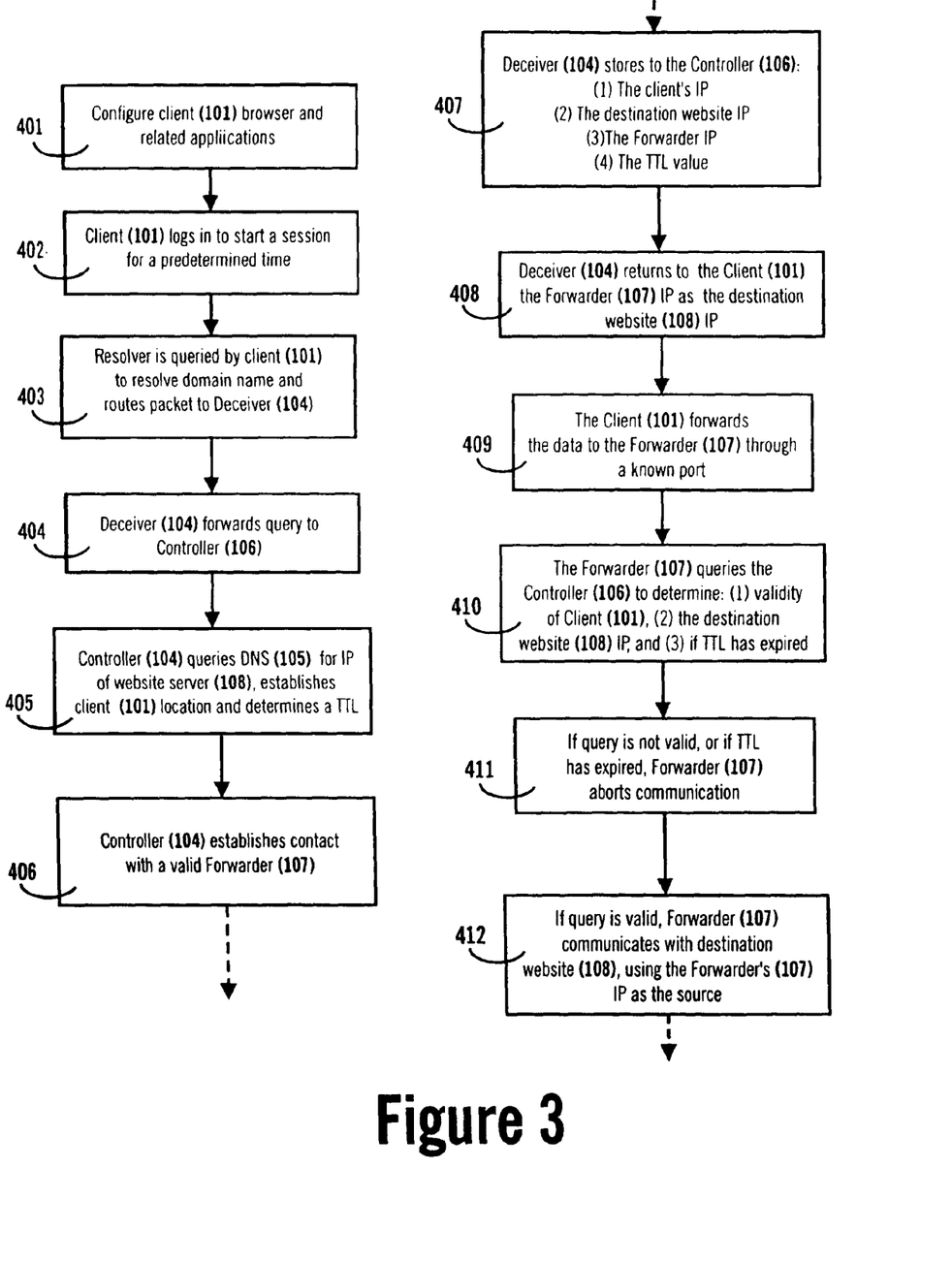
FIG. 3 generally provides a flowchart representation of a client sending a packet to be resolved, and the subsequent misdirection of the client to a destination website via the present invention.
Figure 4:
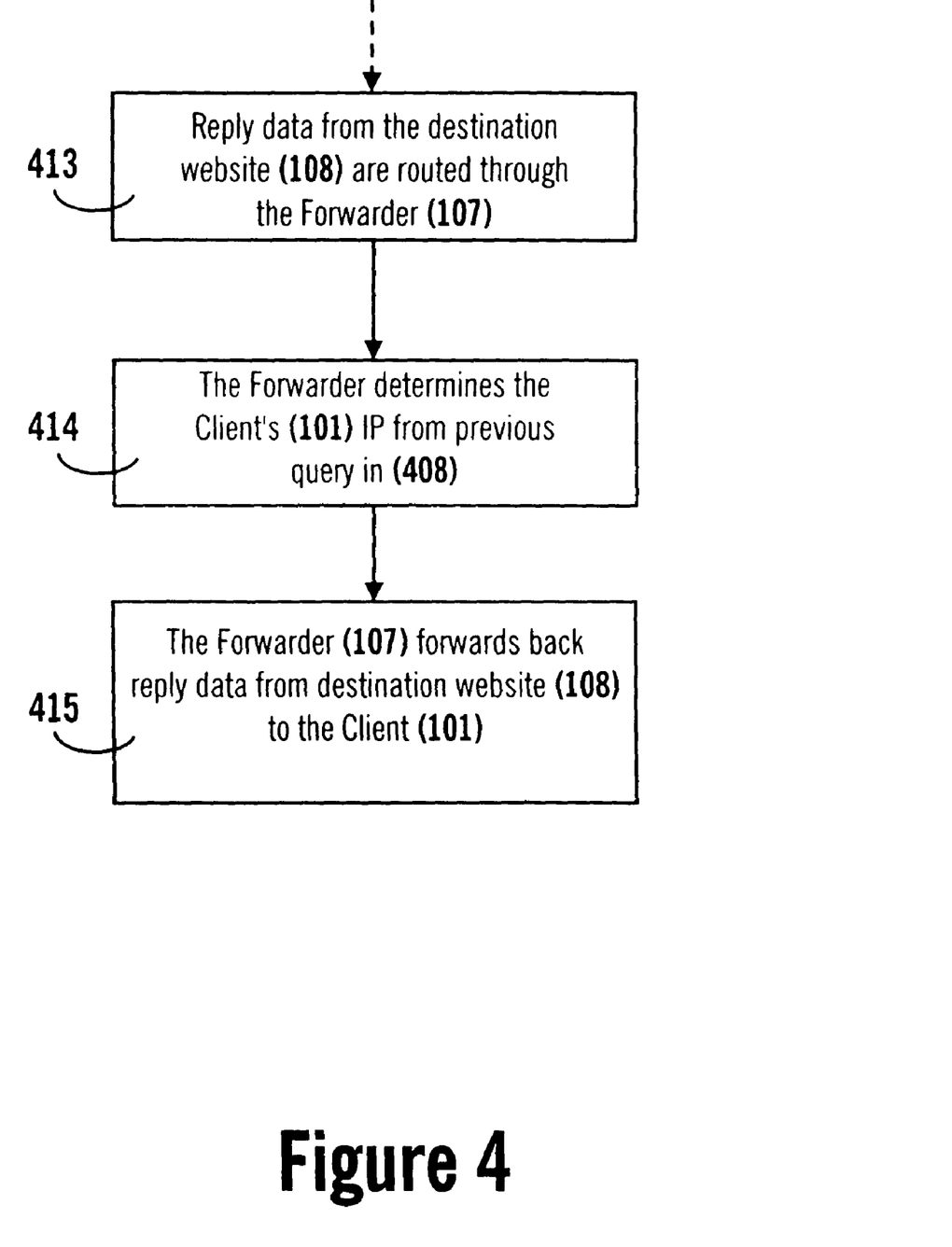
FIG. 4 generally provides a flowchart representation when the website server responds back to the client through the invention.

FIG. 3-4 represent a flowchart representation of the invention as previously disclosed in FIG. 1-2. In step (401), the client configures software/hardware on the client computer, and establishes a session by signing on or logging into a network for a predetermined time (402). When the client wishes to transmit data onto the network, or otherwise communicate with other computers or servers, one option available for the client is to query the resolver in order to retrieve an intended destination site (403). In (403), the resolver query is routed to the deceiver. After receiving the contents of the resolver, the deceiver then forwards the query to the controller in (404).

When the controller receives the query packet, the controller next records the location of the client, determines the TTL for the client session, and further queries a DNS name server, and receives back the IP address of the website which the client wishes to contact (405). In (406), the controller then establishes contact with an available forwarder through which the client session may be transmitted through, and subsequently records the IP address. While it is not displayed in the flowchart, if the controller determines that: (1) a TTL has expired; (2) an invalid client is sending the query; (3) a valid forwarder is unavailable; or (4) a desired website destination is invalid, or any combination thereof, the controller aborts the remainder of the process and transmits the appropriate message or subroutine to the client. If everything is determined to be valid, then the controller proceeds to store into memory the client's IP address, the destination website IP address, the forwarder IP address, and the TTL (407).

In step (408), the controller sends back to the deceiver the forwarder IP address, that is masquerading as the destination website IP address. The deceiver in turn sends the data back to the client (409), where the client then connects with the forwarder through a known port. The forwarder next queries the controller to determine the validity of the client, the status of the TTL, and the IP address of the website which the client is trying to reach (410). Just like the controller, if the forwarder determines at this point that: (1) a TTL has expired; (2) an invalid client is sending the query; or (3) a desired website destination is invalid, or any combination thereof, the forwarder aborts the remainder of the process, and transmits the appropriate message or subroutine back to the client (411). If everything is determined to be valid, the forwarder will proceed to transmit the client's data to the destination website server (412).

Once the destination website receives the data from the client, the server will only recognize the forwarder as the source, and thus would only communicate back to the client via the forwarder. Accordingly, if the website server requires to communicate back to the client, the data is routed through the forwarder (413). When data is received by the forwarder, the forwarder, in principle, reverses the process disclosed in (410) to determine the source client which is intended to receive the website server's data (414). The data may be of any kind including, but not limited to, text, programs, applets, video, audio, etc. Once the forwarder determines the client's proper IP address, the forwarder then transmits the reply data back to the client (415).

Although the present invention has been described in detail, it is to be understood that various changes, alterations, and substitutions can be made without departing from the spirit and scope of the invention. More particularly, it should be apparent to those skilled in the pertinent art that the above described invention is algorithmic and is executable by a suitable conventional computer system or network. Alternate embodiments of the present invention may also be suitably implemented, at least in part, in firmware or hardware, or some suitable combination.

We claim:

1. A system comprising:
a processor; and
a non-transitory computer-readable storage medium storing computer executable components and communicatively coupled to the processor to facilitate operation of the computer executable components, the computer executable components, comprising:
a controller configured to associate a destination internet protocol (IP) address with a forwarder IP address, and further configured to indicate transmission of a first data request from a client IP address to the destination IP address is to be via the forwarder IP address based on a pre-defined combination of the client IP address and the destination IP address being within the first data request, wherein the forwarder IP address, the client IP address and the destination IP address are distinct.

2. The system of claim 1, wherein the computer-executable components further comprise a domain name system (DNS) server configured to receive a second data request containing a destination domain name from the client IP address, wherein the DNS server is further configured to provide a destination IP address based upon the destination domain name.

3. The system of claim 2, wherein the computer-executable components further comprise a deceiver configured to transmit the forwarder IP address to a client having the client IP address in response to receipt of the second data request, wherein the forwarder IP address replaces the destination IP address.

4. The system of claim 2, wherein the computer-executable components further comprise a forwarder having the forwarder IP address.

5. The system of claim 4, wherein the controller is configured to associate the forwarder IP address with the destination IP address contained in the second data request.

6. The system of claim 5, wherein a client creates the first data request including the client IP address and the forwarder IP address is received from a client device.

7. The system of claim 1, wherein the forwarder IP address is employed for a pre-determined amount of time-to-live (TTL) time.

8. The system of claim 7, wherein, in response to expiration of the pre-determined amount of TTL time, the controller is further configured to generate a new forwarder IP address for a pre-defined combination of client IP address and destination IP address, wherein the forwarder IP address, the client IP address and the destination IP address are distinct.

9. A method comprising:
establishing a forwarding internet protocol (IP) address for a pre-defined combination of a client IP address and a destination IP address;
identifying, in a data request received from the client IP address, the pre-defined combination; and
in response to the identifying of the pre-defined combination, forwarding the data request via the forwarding IP address to the destination IP address.

10. The method of claim 9, further comprising:
elapsing a time of a pre-determined duration between the establishing and the forwarding.

11. The method of claim 10, further comprising, in response to the elapsing of the time, re-establishing the forwarding IP address for the pre-defined combination of the client IP address and the destination IP address.

12. The method of claim 9, further comprising:
receiving data at the client IP address from the destination IP address, based upon the pre-defined combination, via the forwarding IP address.

13. The method of claim 9, further comprising:
associating a plurality of client IP addresses with the destination IP address.

14. The method of claim 9, wherein the establishing includes establishing the forwarding IP address for a pre-defined combination of an IP address of a client and a domain name.

15. The method of claim 14, further comprising requesting the destination IP address of the domain name.

16. The method of claim 15, further comprising receiving the forwarding IP address, where the forwarding IP address is masquerading as the destination IP address.

17. A non-transitory computer readable storage medium comprising computer-executable instructions that, in response to execution, cause a computing system to perform operations, comprising:
establishing a forwarding internet protocol (IP) address for a pre-defined combination of a client IP address and a destination IP address;
identifying, in a data request received from the client IP address, the pre-defined combination; and
in response to the identifying of the pre-defined combination, forwarding the data request via the forwarding IP address to the destination IP address.

18. The computer readable storage medium of claim 17, the operations further comprising:
elapsing a time of a pre-determined duration between the establishing and the forwarding.

19. The computer readable storage medium of claim 18, the operations further comprising, in response to the elapsing of the time, re-establishing the forwarding IP address for the pre-defined combination of client IP address and destination IP address.

20. The computer readable storage medium of claim 17, the operations further comprising:
receiving data at the client IP address from the destination IP address, based upon the pre-defined combination, via the forwarding IP address.

21. The computer readable storage medium of claim 17, the operations further comprising:
associating a plurality of client IP addresses with the destination IP address.

22. The computer readable storage medium of claim 17, wherein the establishing includes establishing the forwarding IP address for a pre-defined combination of an IP address of a client and a domain name.

23. The computer readable storage medium of claim 22, the operations further comprising requesting the destination IP address of the domain name.

24. The computer readable storage medium of claim 23, the operations further comprising receiving the forwarding IP address, where the forwarding IP address is masquerading as the destination IP address.

* * * * *

UNITED STATES PATENT AND TRADEMARK OFFICE
CERTIFICATE OF CORRECTION

PATENT NO. : 8,370,457 B2
APPLICATION NO. : 11/717911
DATED : February 5, 2013
INVENTOR(S) : Campbell et al.

It is certified that error appears in the above-identified patent and that said Letters Patent is hereby corrected as shown below:

In the Drawings

In Fig. 3, Sheet 3 of 4, for Tag "401", in Line 2, delete "appliications" and insert -- applications --, therefor.

In the Specifications

In Column 4, Line 30, delete "controller (107)" and insert -- controller (106) --, therefor.

In Column 5, Line 10, delete "etc.)" and insert -- etc.); --, therefor.

In Column 5, Lines 14-15, delete "identification." and insert -- identification; --, therefor.

In Column 5, Lines 39-40, delete "controller (105)" and insert -- controller (106) --, therefor.

In Column 5, Line 41, delete "FIG. 3-4" and insert -- FIGS. 3-4 --, therefor.

In Column 5, Line 42, delete "FIG. 1-2." and insert -- FIGS. 1-2. --, therefor.

Signed and Sealed this
Eighteenth Day of March, 2014

Michelle K. Lee
*Deputy Director of the United States Patent and Trademark Office*